United States Patent [19]

Hiskes

[11] Patent Number: 4,724,539

[45] Date of Patent: Feb. 9, 1988

[54] CALL FORWARDING REPROGRAMMING DEVICE

[76] Inventor: Edward V. Hiskes, 1851 Jadwin #215, Richland, Wash. 99352

[21] Appl. No.: 723,259

[22] Filed: Apr. 15, 1985

[51] Int. Cl.⁴ .............................................. H04M 3/56
[52] U.S. Cl. ..................................... 379/205; 379/387
[58] Field of Search ............ 179/18 BC, 18 BE, 18 B, 179/81 R; 379/204, 205, 387, 202, 206

[56] References Cited

U.S. PATENT DOCUMENTS 4,086,438  4/1978  Kahn .......................... 179/18 BC X Primary Examiner—James L. Dwyer

[57] ABSTRACT

A device attached to a subscriber telephone line is programmed to automatically initiate conference calls connecting two other telephone lines, using the three party custom calling feature offered by modern phone systems. Numbers of the two other telephone lines to be connected may be entered from a remote location.

1 Claim, 2 Drawing Figures

CALL FORWARDING REPROGRAMMING DEVICE

BACKGROUND OF THE INVENTION

The present invention relates to a method and device for remotely controlling call conferencing on a telephone line.

Call conferencing now exists as a standard option for telephone users. At the present time, a user with the call conferencing option on his telephone line, otherwise known as the three party calling option, must initiate a conference from his telephone instrument. A conference call is initiated by calling a first telephone number, then tapping on the switch hook of the telephone until a second dial tone is heard. Then a second number is dialed. Then the switch hook is tapped once again. At this point a three way call exists between the telephone user and the two numbers which he dialed.

However, it would be useful for telephone users to be able to initiate a three party call from a telephone at which they are not present. For example, if the telephone subscriber is away from his home and at a public telephone, it would be helpful if he could arrange to have the public telephone and another phone connected via the conference facility installed on his home telephone. By doing this, the subscriber could avoid the need to put a large number of coins into the pay telephone for a long distance call. Rather, it would be his home telephone that would initiate the long distance call. Thereafter, the three party calling feature would be used to connect the home telephone to the pay telephone.

This use of the three party feature, made possible by remote programming, is a substitute, in many cases, for a telephone credit card or other payment means.

SUMMARY OF THE INVENTION

The main object of this invention is to provide means for using the three party calling feature in order to connect two telephones, A and B, via a third telephone, C, which is equipped with the three party calling feature. This is accomplished by placing a remote control device at C which can imitate the actions of a person at C who desires to initiate a conference between A and B. The remote control device may be instructed to initiate a conference by a person calling from A or B.

DETAILED DESCRIPTION OF THE INVENTION

This device acts to connect telephones A and B via three party calling service available at telephone C. A and B are separate telephone numbers, and can be any number that could be connected in conference from telephone C using the three party calling feature. The invention operates without the need for someone to be present at the site of telephone C. Upon detection of a ringing signal incoming on the line of telephone C, the device will automatically answer the telephone and listen for signals which instruct the device regarding which two numbers are to be connected in a conference. These signals could be generated by a person at telephone A. Thereafter, the person at telephone A hangs up, and the device releases telephone line C. The device then places signals upon telephone line C such that a conference is established between line C, B, and A. Thus, the persons at telephones A and B may communicate via C, without the need for anyone to be at the site of telephone C.

Figure 1:
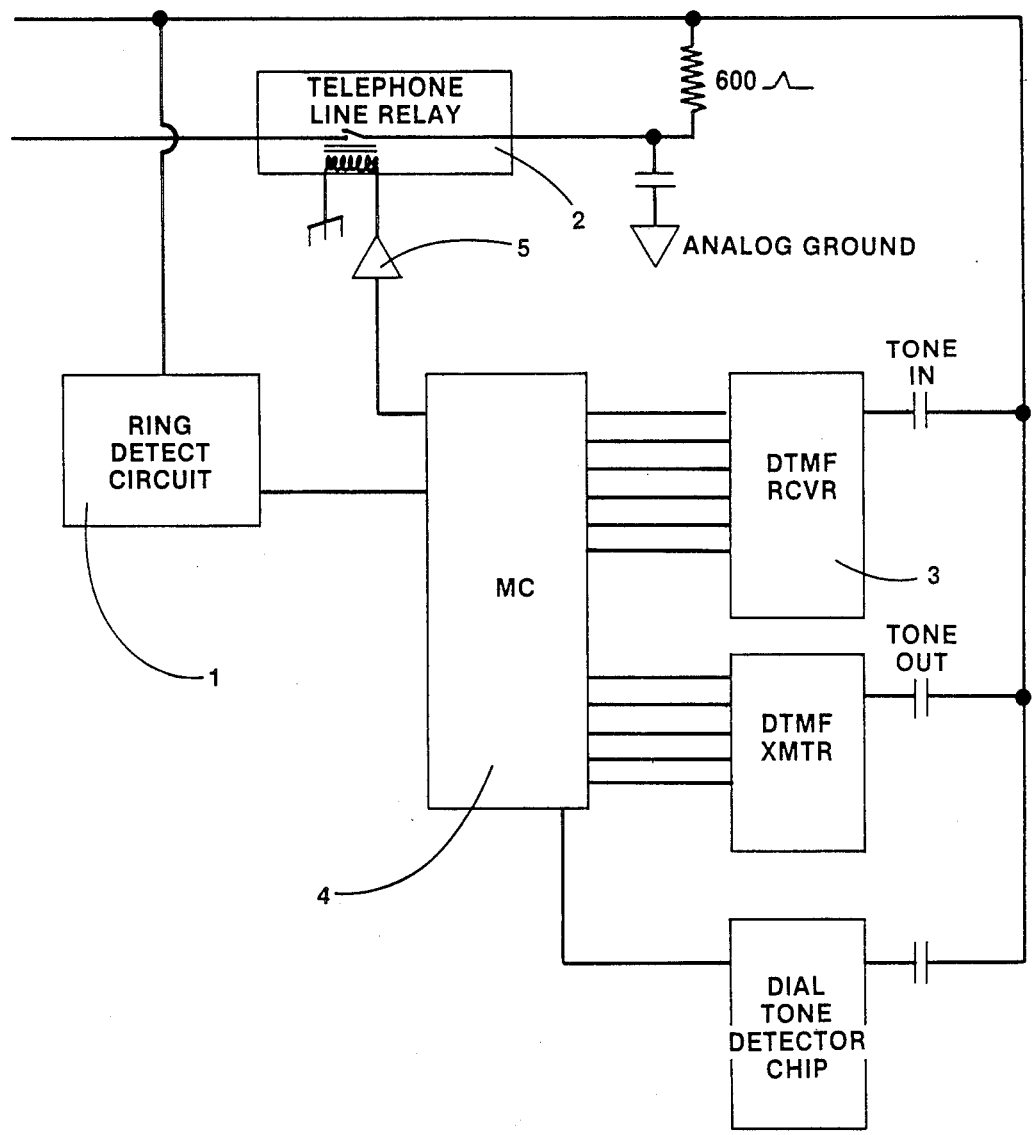
FIG. 1 is a schematic of the call forwarding reprogramming device.

An embodiment of this invention is shown in FIG. 1. Telephone line C is connected to the device. When a person calls telephone line C, ring detect circuit 1 changes the state of the I/O line connected to microcomputer chip 4. Chip 4 is programmed so that another I/O line, suitably buffered by buffer 5, causes relay 2 to close. Line relay 2 completes the current path between the telephone line connectors and causes the telephone line to go into the off hook state. DTMF receiver chip 3 listens on the line for signals. As valid DTMF signals are detected, they are made available on the output of DTMF receiver chip 3. This output data is stored in the memory of microcomputer chip 4.

Then, the caller could type an ID code of, for example, 4 DTMF digits. Then, the caller could type in DTMF signals indicating the phone where he is at. At the end of this sequence of digits, he could press the # button on his phone in order to delimit the number. Thereafter, he could enter the number of the other phone to which he wished to be connected. He could also follow this number with the # button.

The program in the ROM of chip 4 will examine the sequence of DTMF digits that is received. If the ID code is correct, and there are two #'s in the sequence, then the device could send an acknowledge beep to the user. The beep could be generated by DTMF generator chip 5, connected to chip 4's I/O lines.

Thereafter, chip 4's program will cause line relay 2 to open and release the telephone line. Then chip 4 will cause relay 2 to be closed again. First, chip 4 will key DTMF generator 5 in such a way that the number of telephone A is put onto the line. After A has been dialed, chip 4 causes relay 2 and the DTMF chip to do what is required to connect line B using the third party calling feature.

Typically, what is required is for the flow of current in telephone line C to be briefly interrupted . . . so that the action of a person tapping on the switch hook of a telephone is imitated. Chip 4 can do this by causing relay 2 to open for a brief moment.

In the best mode of this invention, dial tone detector chip 6 monitors the result of the switch hook tapping imitation. If the simulated tapping by relay 2 is successful, chip 6 will indicate via an I/O line to chip 4 that dial tone is present on the line. If the simulted tapping is not successful, chip 4 is programmed so that different patterns and lengths of tapping are tried until such time as dial tone is detected.

When dial tone is detected, chip 4 keys the second telephone number into DTMF generator chip 5.

Then, following what is common protocol required by the three party calling feature, relay 2 imitates a switch hook tap again. This connects the two lines together.

Actual part numbers that will operate in FIG. 1 are as follows: an 8748 microcomputer; and 8870 DTMF receiver; a 5088 DTMF generator; and a 567 dial tone detector chip. Relay buffer 5 can be several sections of a 4049 buffer tied in parallel.

Figure 2:
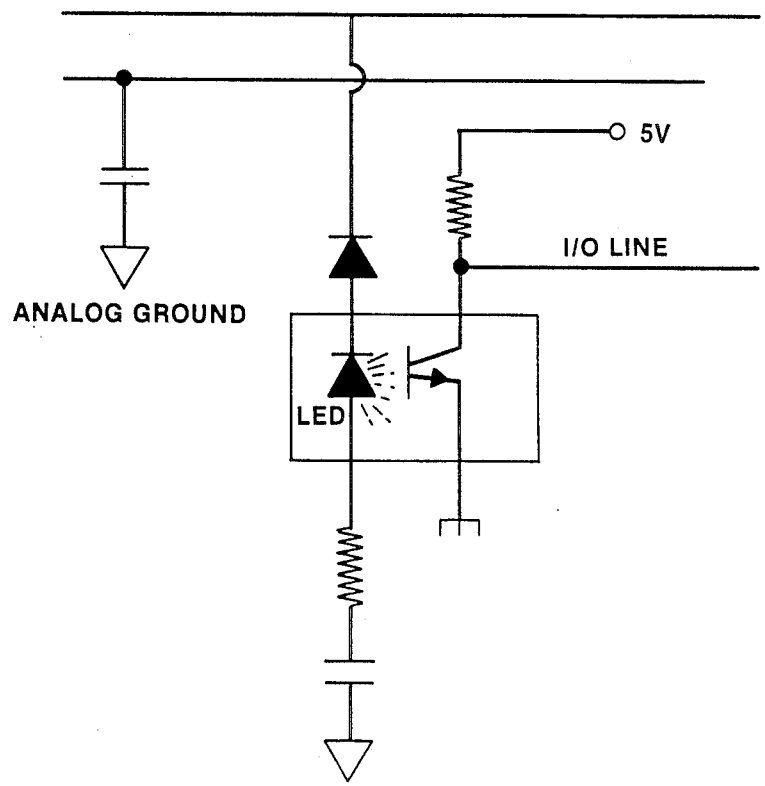
FIG. 2 is a schematic of ring detect circuitry for the device.

The ring detect circuitry shown in FIG. 2 comprises an optoisolator chip. High ringing voltage peaks cause current to flow through the LED of the optoisolator. These, in turn, change the state of the I/O line.

Many alternate schemes exist for accomplishing the goal of this invention. For example, rather than using DTMF signals for number of ID input, voice recognition technology could be used. Furthermore, if the user knew in advance what lines he wished to connect in a conference, a pre-set pair of numbers could be stored in the device.

The device could also be set up to sponstaneously initiate conferences using stored numbers at a given time of the day, or upon the occurance of some other condition.

Discrete components could accomplish the functions of the device. In fact, the numbers dialed could be simply recorded by an analog device such as a cassette recorder and played back into the phone, rather than being recieved by a DTMF reciever, stored, and later output by a DTMF generator. Upon ringing of line C, a relay would answer the phone and a casette would record the digits of two telephone numbers separated, say, by a press of the * button. After the caller had hung up, the device would take the phone off the hook again and simply play back into the phone line. A tone detector connected to the line would listen for the * tone separating the numbers. When this was heard, the detector would cause the line relay to briefly open the line . . . as an imitation of the switch hook tap. Then the cassette would proceed to play the second number into the line. At the end, the device would cause a second tap to occur so that the three party calling protocol is satisfied. This could be accomplished by the caller having inserted a second * on the cassette at the end of the second number.

Once a conversation is finished, it is necessary to assure that the device will release line C. This can be causing the device on line C to reset to a given state upon receipt of a certain pattern of DTMF digits. For example, at the end of the conversation, one of the callers could simply hit the # button.

Alternatively, the device could reset when it heard dial tone. This would indicate that the callers had hung up. Or, the device could also include a circuit that monitored the level of speech energy on the line. When speech ends, the device would reset.

Thus, the essence of this invention is not only a particular device. It is most broadly a new use for the three party calling feature: connecting two phones via a non-manned telephone, using instructions supplied either by a person at a remote site, or by a pre-set program at the non-manned telephone.

What is claimed is:

1. A subscriber device connectable to a call conferencing feature provided as a service by the central office via a subscriber line, for controlling the call conferencing from a location remote from said device via the subscriber line, the device comprising;

input means connectable to the subscriber telephone line for receiving signals remotely applied to the line;

output means connectable to the subscriber telephone line for applying output signals thereto;

means for storing phone numbers received from the remote location via the input means and for applying said phone numbers to said telephone line via said output means;

control means connected to said storing means, said input means, and said output means to connect the device to the call conferencing feature service, and further to apply the remotely stored phone numbers to program the call conferencing feature to enable the remote location to become an active member in the call conference.

* * * * *